United States Patent [19]
Duong et al.

[11] Patent Number: 5,003,580
[45] Date of Patent: Mar. 26, 1991

[54] ADAPTER FOR INTERFACING A WORK STATION TERMINAL TO A KEY TELEPHONE SYSTEM

[75] Inventors: Dzung M. Duong, Terrigal; Evan J. Stanbury, Lakemba, both of Australia

[73] Assignee: Standard Telephones and Cables Pty. Ltd., Alexandria, Australia

[21] Appl. No.: 337,523

[22] PCT Filed: Sep. 8, 1987

[86] PCT No.: PCT/AU87/00305
§ 371 Date: Mar. 8, 1989
§ 102(e) Date: Mar. 8, 1989

[87] PCT Pub. No.: WO88/02206
PCT Pub. Date: Mar. 24, 1988

[30] Foreign Application Priority Data
Sep. 16, 1986 [AU] Australia .............................. PH8034
Oct. 10, 1986 [AU] Australia .............................. PH8434

[51] Int. Cl.⁵ .............................................. H04M 11/00
[52] U.S. Cl. ......................................... 379/93; 379/96; 379/442
[58] Field of Search ....................... 379/93, 96, 97, 98, 379/442, 443

[56] References Cited

U.S. PATENT DOCUMENTS

| | | |
|---|---|---|
| 4,009,342 | 2/1977 | Fahrenschon et al. |
| 4,306,116 | 12/1981 | McClure et al. |
| 4,350,848 | 9/1982 | Kariya et al. |
| 4,640,989 | 2/1987 | Riner et al. ........................ 379/96 X |
| 4,689,814 | 8/1987 | Warner, II ............................ 379/93 |
| 4,860,342 | 8/1989 | Danner ................................ 379/96 |

FOREIGN PATENT DOCUMENTS

| | | |
|---|---|---|
| 1140691 | 2/1983 | Canada . |
| 1604296 | 12/1981 | United Kingdom . |
| 2105950 | 3/1983 | United Kingdom . |
| 2212698 | 7/1989 | United Kingdom ................ 379/100 |

*Primary Examiner*—Keith E. George
*Attorney, Agent, or Firm*—Christie, Parker & Hale

[57] ABSTRACT

An interface arrangement (2) comprising interface circuits (5,7) and processor (14) allows a personal computer (10) to operate in conjunction with a telephone subset (1) associated with a main switch system (9) in which the signalling systems used by the telephone subset and the computer differ. The interface arrangement allows the subset and the computer to be connected to the subsets switching system to permit at least some of the subsets signalling functions to be performed by the computer.

15 Claims, 4 Drawing Sheets

ADAPTER FOR INTERFACING A WORK STATION TERMINAL TO A KEY TELEPHONE SYSTEM

TECHNICAL FIELD

This invention relates to a device to allow a computer such as a personal computer to operate in conjunction with a telephone subset, and to a system embodying such a device.

BACKGROUND ART

The invention finds particular application where the signalling systems used by the telephone subset and the computer differ, as, for example, is the case where the telephone is a small business system (SBS) telephone. Such telephones are usually 4 wire telephones, having one pair for signalling and another pair for speech.

Many SBS systems use unique signalling methods between the subsets and the SBS switching equipment such as, for example, pulse string signalling, while a large number of personal computers use a standard signalling system.

It is desirable to incorporate telephone directory and call handling facilities into a personal computer so there will be no need for the telephone user to memorize various telephone numbers and call handling codes. These facilities can be displayed on the PC screen in the option menu format and selected as appropriate. For instance telephone directory information for internal and external calls can be stored in the computer and the computer can be programmed to emit dialling signals in the normal PC signalling code. Other features such as call forwarding, call back, hold etc. can also be included. However these signals will not be recognized by the SBS switching processor as it will only recognize signals in its own unique format.

SUMMARY OF THE INVENTION

This specification therefore discloses a device to allow a subset and a computer to be connected to the subset's switching system to permit at least some of the subset signalling functions to be performed by the computer. The arrangement also allows the computer to communicate with other computers connected either to the local subset switching system or to the general telephone network to which the switching system has access, including those connected to the network via similar switching systems.

According to a first aspect of the present invention there is provided an adaptor circuit to enable an SBS station and a work station terminal to be connected to the station's voice and signalling lines from the SBS main equipment, the adaptor comprising a processor, a first interface circuit, a second interface circuit and a third interface circuit, the first interface circuit being arranged to provide an interface between the main equipment signal line and the processor, the second interface being arranged to provide an interface between the station signal line and the processor, and the third interface circuit being arranged to provide an interface between the work station terminal and the processor, wherein the processor is programmed to control the first and second interfaces so that in a first mode signals on said signal lines are passed between each other unaltered in format, and in a second mode when it is desired to use the work station keyboard to perform telephone call functions, the processor causes the station signal line and the main equipment signal line to be de-coupled from each other and couple them to the second and first interface circuits respectively, said processor having emulation programs stored therein to emulate the station through the first interface circuit and to emulate the main equipment through the second interface circuit.

Accordingly to a further aspect of the present invention there is provided an adaptor circuit to enable an SBS station and a work station terminal to be connected to the station's voice and signalling lines from the SBS main equipment, the adaptor comprising a processor, a first interface circuit, a second interface circuit, a third interface circuit, and a first relay arrangement, wherein the first relay arrangement comprises first and second sets of changeover paths, the first set of changeover paths arranged to connect the signal line from the main equipment to either the station signal line or the first interface circuit, and the second set arranged to connect the signal line from the station to either the main equipment signal line or to the second interface circuit, the first interface circuit being connected between the main equipment signal line and the processor, the second interface circuit being connected between the station signal line and the processor, and the third interface circuit and being connected between the work station terminal and the processor, and wherein the processor is programmed to control the first relay arrangement so that in a first mode the first and second interfaces are disconnected and the station signal line is connected to the main equipment signal line, and in a second mode when it is desired to use the work station keyboard to perform telephone call functions, the processor causes the first relay arrangement to disconnect the station signal line and the main equipment signal line from each other and to connect them to the second and first interface circuits respectively, and wherein the processor is programmed to emulate the station through the first interface circuit and to emulate the main equipment through the second interface circuit.

BRIEF DESCRIPTION OF THE DRAWINGS

The invention will be more fuly described with reference to the accompanying drawings in which.

BEST MODE OF CARRYING OUT THE INVENTION

Figure 1:
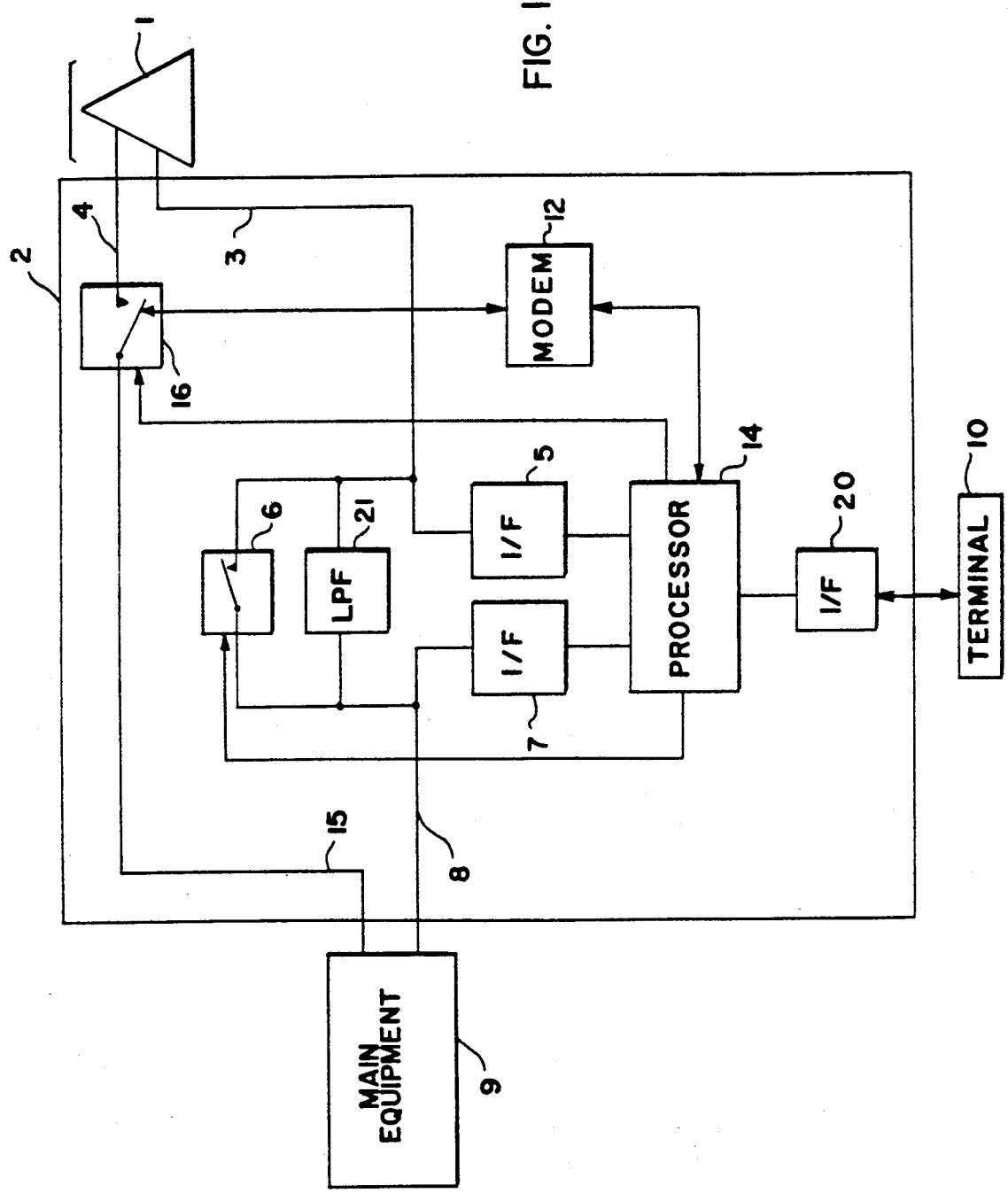
FIG. 1 shows a block diagram of a first embodiment of the present invention.
Figure 2:
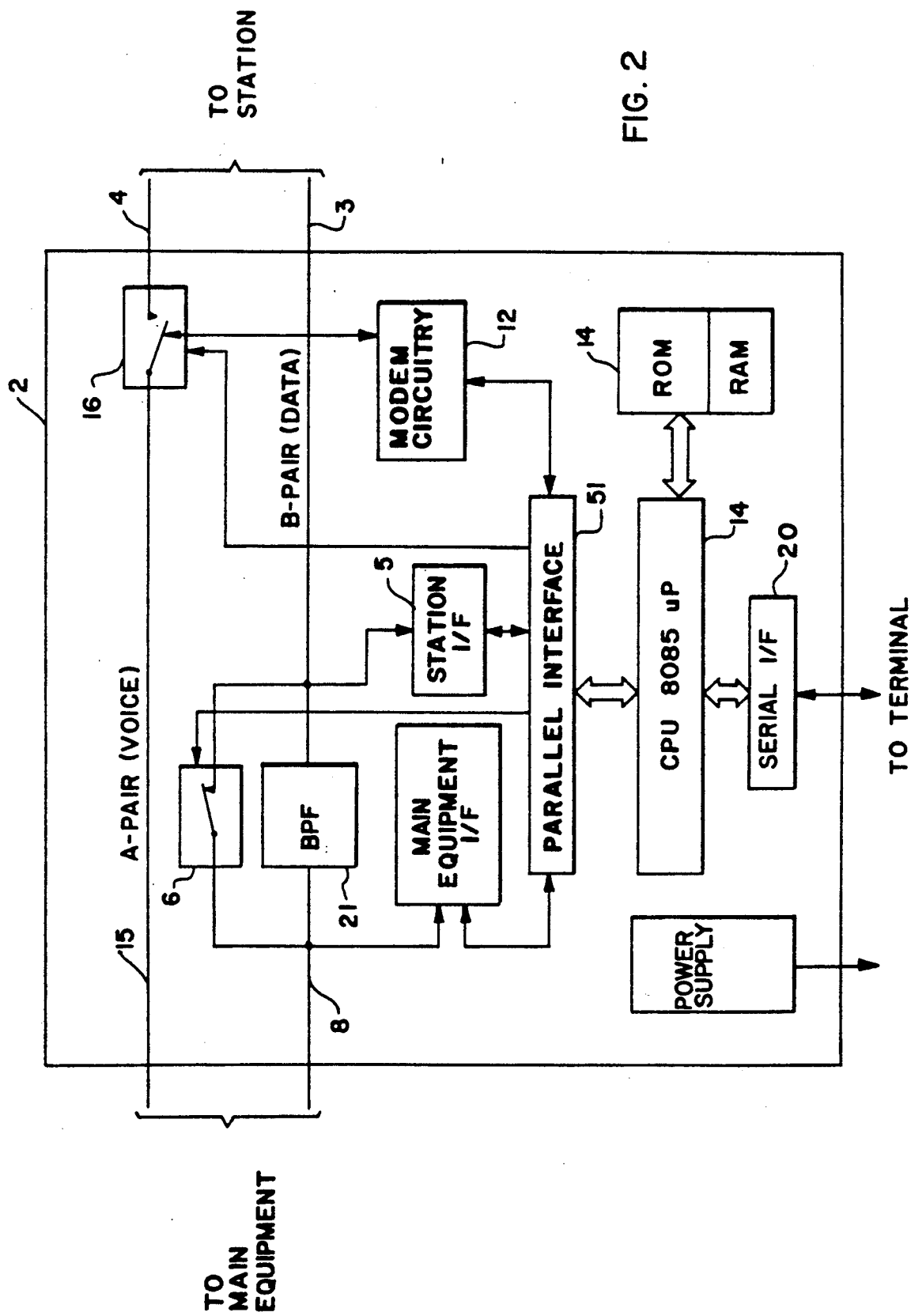
FIG. 2 shows a more detailed diagram of the adaptor circuit incorporated in FIG. 1.

With reference to FIGS. 1 and 2 of the drawings, station 1 is connected to a voice line 4 and a signal line 3, and the SBS main switching equipment 9 is connected to voice line 15 and signal line 8. Changeover relay 16 is arranged to connect line 15 to either line 4 or to modem 12 which is in turn connected to processor 14.

Interposed between signal lines 3 and 8 is a low pass filter 21 which, on the one hand permits DC power supply current supplied by the main equipment 9 to pass therethrough to the station 1, and on the other hand, blocks signals from the main equipment and directs them to the input of interface 7. In parallel with low pass filter 21 is a set of break contacts associated with relay 6 which ensure that, if power is removed from the adaptor, signals from station 1 are shunted around low pass filter 21 by the break contacts which close when relay 6 drops out when power is removed. Relay 16 performs a similar function on the voice pair. Thus, with the adaptor de-energized the main equipment 9 and station 1 can still communicate.

Processor 14 may have additional memory 141.

Interface 20 connects a work station terminal 10 to processor 14.

The interface circuits serve the purpose of converting the signalling pulses from line 8 to digital data for the micro-processor and vice versa. Depending on the instructions from work station terminal 10, the processor 14 determines whether any modification to the data is required, whereupon it transfers the data to interface 5 which converts the data into signalling pulses for coupling to line 3.

Interface 7 provides voltage conversion and isolation between system switch 9 and the rest of circuit 2. Interface 5 performs similar functions for subset 1.

Relay 16 is controlled by the processor 14 according to the function selected for the interface.

A serial data interface circuit 20 may be provided between the computer 10 and MODEM 12.

The voice signals from the station 1 on line 4 are connected selectively to switching system 9 over line 15. Switch 16 is controllable to connect data from either the station or from modem 12 in accordance with whichever of the two is selected.

The processor may perform a plurality of functions.

A supervisory task manages processor time and schedules and coordinates the system tasks. Three elements are used for this purpose. Each function is assigned a priority which may be time based or function based and each task competes for processor time on this basis. This is followed by the message to convey data and synchronization between tasks. The exchange comprises the means through which one task sends messages to another.

The timer task comprises a real time clock signal which performs functions such as watch-dog, message time-out and the like.

The switching system task accepts and interprets signals from the switching equipment 9 and performs message establishing procedures (handshake). It also responds to requests from the processor 14 and sends signals to the equipment 9.

The station task is similar to the switching system task.

The Modem task performs all the modem related functions which are not performed in the Modem circuit 12, dispatches commands to Modem 12 and monitors its status.

The computer task manages communications with computer 10. Preferably this should use commands similar to the Hayes modem to ensure compatibility with many MSDOS software packages. Basic functions include:

General commands:

| Select on-line mode: | ATO |
| --- | --- |
| Reset modem : | ATZ |
| Control monitor echo in local mode: | ATE0 (echo off) |
| | ATE1 (echo on) |
| Select local mode: | (1 sec. delay) |
| | +++ (sec. delay) |

Dialling commands:

| Tone dial: | ATD nnn | (nnn = Phone no.) |
| --- | --- | --- |
| Pulse dial: | ATDPnnn | |
| Redial last No.: | A/ | |
| Immediate auto answer: | ATA | |
| Hang up: | ATH | |

In addition to the modem functions, computer task also recognizes a second set of commands that is applicable to the key telephone operations. All commands of this second set begin with "AS" and end with a RETURN. Following is a list of the basic key telephone commands:

| Make an intercom call | : ASIn | (n: station number) |
| --- | --- | --- |
| Make an outside call | : ASXn | (n: station number) |
| Redial last number | : ASL | |
| Repertory dialing | : ASR | |
| Abbreviated dialing | : ASV | |
| Answer incoming call | : ASA | |

These commands can be keyed into the adaptor from a work station keyboard or may be generated in a computer program in the terminal.

The function of the arrangement is as follows.

When the SBS station is not in use and the computer terminal is not being used to exchange data over the phone line, the adaptor circuit is in what is termed the Command State. In this state the contacts of relay 16 connect voice lines 4 and 15 together, and the adaptor circuit acts as a signal repeater. Pulse train data received by interface 7 from main equipment 9 is passed to processor 14 which processes this information and regenerates signals of the same format. The regenerated signals are coupled to interface 5 which transmits the signals to station 1 on line 3. Similarly, data received by interface 5 from station 1 is passed to processor 14 which processes this information and regenerates signals of the same format. The regenerated signals are coupled to interface 7 which transmits the signals to main equipment 9. This means that in many SBS systems, the main equipment will poll each station in turn to ascertain the status thereof. The stations respond with a status indication e.g. ON-HOOK, OFF-HOOK, DIALLING etc. Failure of a station to receive its scheduled polling interrogation causes it to reset, i.e. to establish ON-HOOK conditions.

When the user desires to use the computer terminal to establish a call he operates the unique key combination on the terminal keyboard e.g. CONTROL BACK-SLASH which causes the terminal to bring up the function menu from which the appropriate function can be selected, e.g. Establish Outside Call—press key F1. In response to this the terminal will present him with the option of dialling the number if he knows it or calling up a directory which can be searched by a Find "ABC . . ." type command. The user can then select the destination from the directory and the terminal will output a string of ASCII codes representing the desired number. This is fed via interface 20 to microprocessor 14 which recognizes the command to make a call and causes the main equipment interface 7 to be coupled to the main equipment and the station interface 5 to the station.

The adaptor circuit then having converted the dial signalling to the main equipment signalling code, the coded dial signals are transmitted to the main equipment via interface 7, together with an indication that the station is in the loud speaking or monitor mode.

During this operation the adaptor circuit generates polling signals in response to polling signals from the main equipment and transmits them to station 1 via interface 5 to maintain the station so it does not reset.

When the dialling code has been transmitted to the main equipment, processor 14 restores interface circuits 5 and 7 to the first mode so the station can be used in the normal way to carry on the phone conversation.

Alternatively the interface may be required to generate a command to cause the station 1 to go into a loud speaking or monitor mode if this is required by the station circuitry.

The adaptor circuit emulates the station when it exchanges signals with the main equipment, and it emulates the main equipment when exchanging signals with the station. Thus when it receives a polling interrogation from the main equipment this signal is passed via interfaces 7 and 51 to the CPU 14 which initiates an appropriate response, for example a signal corresponding to that which would indicate the station is in the monitor mode, or dialling signals were being transmitted.

The receipt of a polling signal by the adaptor circuit also causes the CPU 14 to initiate a corresponding signal for transmission to the station via interface 5. This is necessary to ensure that the station does not reset. The emulation programs are stored in memory 141 of processor 14. On completion of the call the subscriber can terminate the call by pressing an appropriate button e.g. F7 which causes the adaptor circuit to send data to the main equipment indicating that the call has been terminated. The last number redial feature is provided in the SBS system by storing the number in the main equipment memory so that all that is necessary once the user has put his terminal 10 into the telephone mode is to press the button dedicated to last number redial on the terminal keyboard and the matching circuit will send the appropriate signal to the main equipment 9.

Repertory dialling is also provided in SBS systems by storing in the main equipment memory the numbers corresponding to respective dedicated station buttons. The repertory dialling index may be stored in the computer terminal and selected from the option menu and the user may instruct the terminal to dial a selected station. This feature is similar to the normal call procedure as far as the user is concerned, the difference being that in the normal call the numbers are initiated from the terminal 10 while in repertory dialling mode the numbers are stored in the main equipment 9 and initiated by an appropriate signal from the terminal 10.

Abbreviated code dialling, may be implemented in a manner identical with that for repertory dialling. As an alternative the system may be configured to allow the user to select the abbreviated dialling mode and then press the appropriate abbreviated call buttons on the station.

There is a degree of redundancy with the repertory dialling and abbreviated call dialling because, as far as the user is concerned, these features can be achieved simply by use of the normal call set-up procedure using the directory in the terminal 10. However the added directories for the additional features may facilitate making calls to frequently dialled numbers.

The user can answer an incoming call while at the terminal by putting the terminal into the phone mode and pressing the appropriate button.

Instead of an intelligent terminal 10 the terminal may be of the type which does not contain sufficient processing capability to allow the storage and transmission of e.g. the telephone directory. In that case the keyboard information is fed to the interface so the user can still make use of the matching circuit though the user must send an appropriate prefix and the number to be dialled by depressing the appropriate keys. This is the action which the intelligent terminal is programmed to perform automatically.

A further use for the arrangement is to allow the terminal 10 to communicate with another terminal connected either to the SBS main equipment or to the general telephone network.

In this mode the call to the other terminal is initiated as previously described. Relay 16 is operated to disconnect the station voice line 4 and to connect modem 12 to the main equipment A-pair (voice) 15. The modem 12 converts outgoing signals to the appropriate tone code and incoming tone code to suitable digital format to be relayed to the terminal 10. The processor 14 does not respond to any buttons operated at station 1 during this mode.

Figure 3:
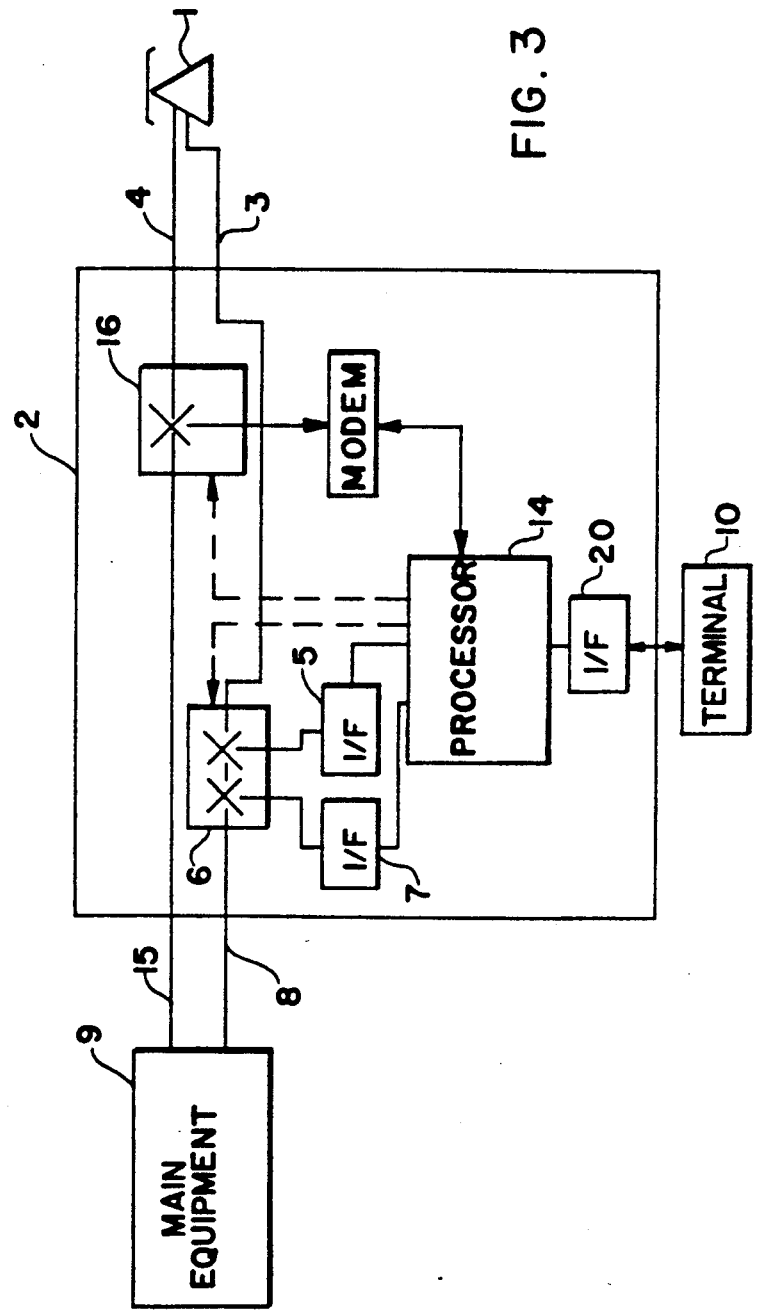
FIG. 3 shows a block diagram of a second embodiment of the present invention.
Figure 4:
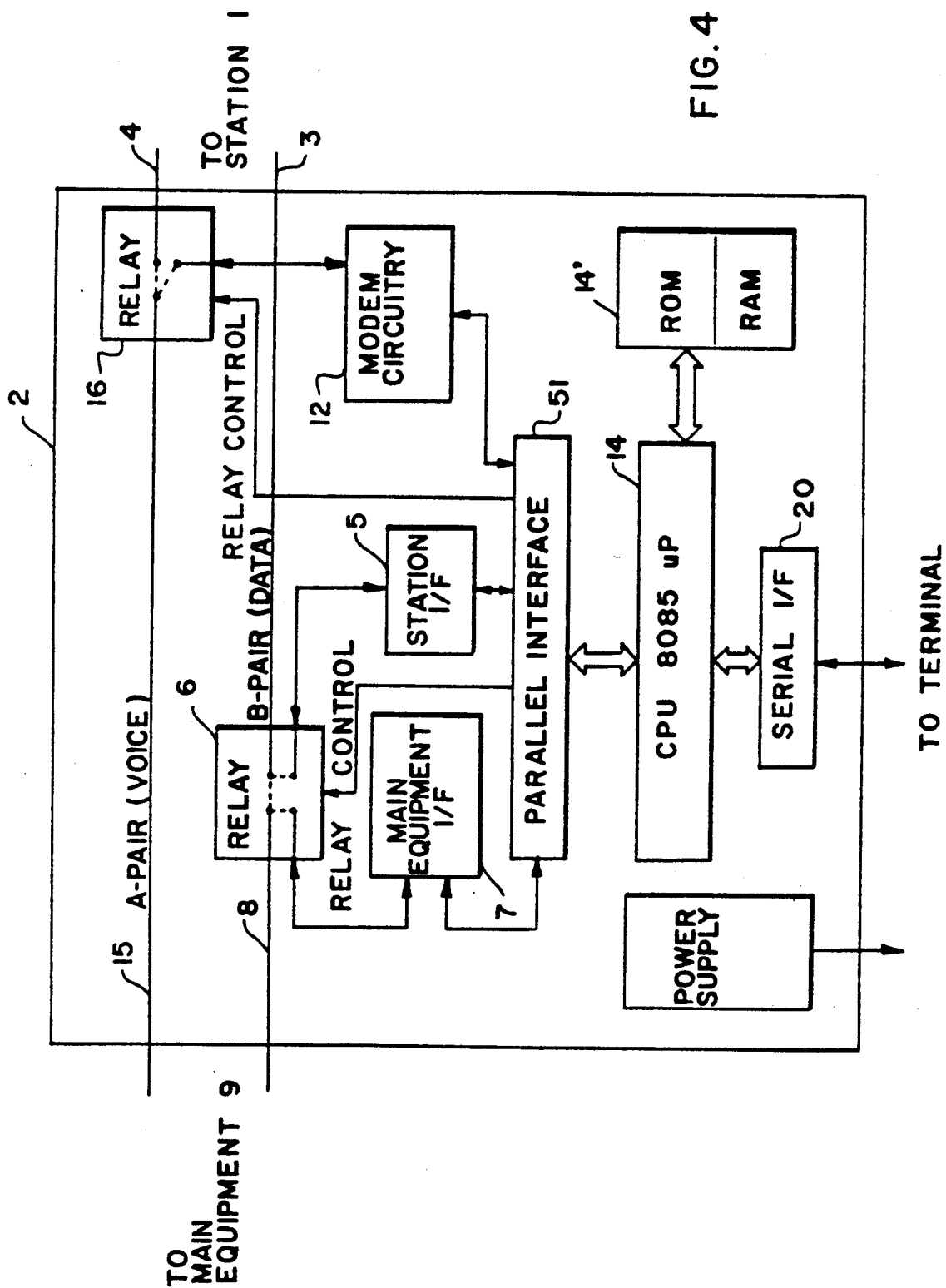
FIG. 4 shows a more detailed diagram of the adaptor circuit incorporated in FIG. 3.

Referring to FIGS. 3 and 4 of the drawings, station 1 is connected to a voice line 4 and a signal line 3, and the SBS main switching equipment 9 is connected to voice line 15 and signal line 8. Changeover relay 16 is arranged to connect line 15 to either line 4 or to modem 12 which is in turn connected to processor 14, while relay 6 connects line 8 either to line 3 or to interface 7, and it also connects line 3 either to line 8 or interface 5. In some applications it may be useful to have a serial/parallel interface between interfaces 5 and 7 and processor 14. Processor 14 may have additional memory 141.

Interface 20 connects a work station terminal 10 to processor 14.

The interface circuits serve the purpose of converting the signalling pulses from line 8 to digital data for the micro-processor and vice versa.

Interface 7 provides voltage conversion and isolation between system switch 9 and the rest of circuit 2. Interface 5 performs similar functions for subset 1.

Relays 6 and 16 are controlled by the processor 14 according to the function selected for the interface.

A serial data interface circuit 20 may be provided between the computer 10 and MODEM 12.

The voice signals from the station 1 on line 4 are connected selectively to switching system 9 over line 15. Switch 16 is controllable to connect data from either the station or from modem 12 in accordance with whichever of the two is selected.

The function of this alternate arrangement is as follows.

When the SBS station is not in use and the computer terminal is not being used to exchange data over the phone line, the matching circuit is in what is termed the Command State. In this state relays 6 and 16 connect the station directly to the switching equipment, so that the SBS station operates in the normal way. This means that in many SBS systems, the main equipment will poll each station in turn to ascertain the status thereof. The stations respond with a status indication e.g. ON-HOOK, OFF-HOOK, DIALLING etc. Failure of a station to receive its scheduled polling interrogation causes it to reset, i.e. to establish ON-HOOK conditions.

When the user desires to use the computer terminal to establish a call he operates the unique key combination on the terminal keyboard e.g. CONTROL BACK-SLASH which causes the terminal to bring up the function menu from which the appropriate function can be selected, e.g. Establish Outside Call—press key F1. In response to this terminal will present him with the option of dialling the number if he knows it or of calling up a directory which can be searched by a Find "ABC . . . " type command. The user can then select the destination from the directory and the terminal will output an ASCII code representing the desired number. This is fed via interface 20 to microprocessor 14 which recognizes the command to make a call and operates relay 6 to connect the main equipment interface 7 to the main equipment and the station interface 5 to the station, interrupting the through connection or the data line between station and main equipment.

The adaptor circuit then having converted the dial signalling to the main equipment signalling code, the coded dial signals are transmitted to the main equipment via interface 7, together with an indication that the station is in the loud speaking or monitor mode.

During this operation the adaptor circuit generates polling signals in response to polling signals from the main equipment and transmits them to station 1 via interface 5 to maintain the station so it does not reset.

When the dialling code has been transmitted to the main equipment, the adaptor circuit operates relay 6 to connect the station to the main equipment so the station can be used in the normal way to carry on the phone conversation.

Alternatively the interface may be required to generate a command to cause the station 1 to go into a loud speaking or monitor mode if this is required by the station circuitry.

The adaptor circuit emulates the station when it exchanges signals with the main equipment, and it emulates the main equipment when exchanging signals with the station. Thus when it receives a polling interrogation from the main equipment this signal is passed via interfaces 7 and 51 to the CPU 14 which initiates an appropriate response, for example a signal corresponding to that which would indicate the station is in the monitor mode, or dialling signals were being transmitted.

The receipt of a polling signal by the matching circuit also causes the CPU 14 to initiate a corresponding signal for transmission to the station via interface 5. This is necessary to ensure that the station does not reset. The emulation programs are stored in memory 141 of processor 14. On completition of the call the subscriber can terminate the call by pressing an appropriate button e.g. PF7 which causes the matching circuit to interrupt relay 6 for a period sufficiently long to cause the station to reset so the main equipment will recognize that the call has ended.

Alternatively the subscriber at the other end of the call may hang up and the call will be terminated in the usual way. The last number redial feature is provided in the SBS system by storing the number in the main equipment memory so that all that is necessary once the user has put his terminal 10 into the telephone mode is to press the button dedicated to last number redial on the terminal keyboard and the matching circuit will send the appropriate signal to the main equipment 9. Relay 6 then returns the connection between the station 1 and the main equipment 9.

Repetory dialling and abbreviated code dialling is implemented in a manner identical to that of the first preferred arrangement.

As with the first preferred arrangement, instead of an intelligent terminal 10 the terminal may be of the type which does not contain sufficient processing capability to allow the storage and transmission of e.g. the telephone directory. In that case the keyboard information is fed to the interface so the user can still make use of the matching circuit though the user must send an appropriate prefix and the number to be dialled by depressing the appropriate keys. This is the action which the intelligent terminal is programmed to perform automatically.

A further use for the arrangement is to allow the terminal 10 to communicate with another terminal connected either to the SBS main equipment or to the general telephone network.

In this mode the call to the other terminal is initiated as previously described but once the matching circuit has sent the dial signal relay 6 does not switch the matching circuit out of line but leaves the station disconnected. Instead relay 16 is operated to disconnect the station voice line 4 and to connect modem 12 to the main equipment A-pair 15. The modem 12 converts outgoing signals to the appropriate tone code and incoming tone code to suitable digital format to be relayed to the terminal 10.

Relay 6 may be arranged in the "fail-safe" manner described in relation to the first preferred arrangement.

We claim:

1. An adaptor circuit to enable a key telephone subset and a work station terminal to be connected via voice and signalling lines to key telephone switching equipment, the adaptor comprising
   a processor,
   a first interface circuit between the processor and a portion of signal line leading to the switching equipment,
   a second interface circuit between processor and a portion of the signal line leading to the telephone subset, and a third interface circuit between the terminal and the processor,
   wherein the processor is programmed to control the first and second interfaces such that
   in a first mode signals on said signal line portions are passed between each other unaltered in format, and
   in a second mode, when it is desired to use the work station to perform telephone call functions, the processor causes the signal line portion leading to the telephone subset and signal line portion leading to the telephone switching equipment to be coupled to the second and first interface circuits respectively, with said processor emulating the telephone subset through the first interface circuit and emulating the telephone switching equipment through the second interface circuit.

2. An adaptor circuit as claimed in claim 1, wherein switching signals from the telephone switching equipment are passed by the first interface circuit to said processor where they are reproduced and passed to the telephone subset via the second interface circuit, and
switching signals from the telephone subset are passed by the second interface circuit to said processor where they are reproduced and passed to the telephone switching equipment via the first interface circuit.

3. An adaptor circuit as claimed in claim 2, wherein said signal line leading to telephone switching equipment is coupled to said signal line portion leading to the telephone subset via a low pass filter means arranged to pass DC current and block switching signals between the two signal line portions, and each said signal line portion is provided with a signal path to its associated interface circuit.

4. An adaptor circuit as claimed in claim 3, further comprising a switchable conducting path in parallel with said low pass filter, which is rendered conducting when power energizing said adapter circuit is removed, and which is rendered nonconducting when said adaptor circuit is energized.

5. An adaptor circuit as claimed in claim 4, wherein said switchable conducting path comprises contact springs and an associated relay means.

6. An adaptor circuit as claimed in claim 1, wherein the processor is arranged to restore the first, second and third interface circuits to the first mode after a call dialling signal has been transmitted via the first interface circuit.

7. An adaptor circuit to enable a key telephone subset and a work station to be connected to voice and signalling lines from key telephone system switching equipment, the adaptor comprising
    a processor,
    a first interface circuit,
    a second interface circuit,
    a third interface circuit, and
    a first relay arrangement further comprising
        a first set of changeover paths arranged to connect a first signal line from the switching equipment to either the subset or to the first interface circuit, and
        a second set of changeover paths arranged to connect a second signal line from the subset to either the first signal line or to the second interface circuit, wherein
    the first interface circuit is connected between the first signal line and the processor,
    the second interface circuit is connected between the second signal line and the processor, and
    the third interface circuit is connected between the work station terminal and the processor, and
    the processor is programmed to control the first relay arrangement so that
        in a first mode the first and second interfaces are disconnected and the first signal line is connected to the second signal line, and
        in a second mode when it is desired to use the work station keyboard to perform telephone call functions, the processor causes the first relay arrangement to disconnect the first and second signal lines from each other and to connect them to the first and second interface circuits respectively, and
    the processor emulates the subset through the first interface circuit and emulates the switching equipment through the second interface circuit.

8. An adaptor circuit as claimed in claim 7, wherein the processor restores the first relay arrangement to the first mode when a call dialling signal has been transmitted via the first interface circuit.

9. An adaptor circuit as claimed in claim 1, further comprising
    a second relay arrangement comprising a third changeover path arranged to connect the voice line from the switching equipment either to the subset or to a modem connected to the processor, the second relay arrangement being controlled by the processor.

10. An adaptor circuit as claimed in claim 8, wherein the first relay arrangement comprises electronic switching means.

11. A key telephone system comprising
    a work station terminal,
    a key telephone subset,
    key telephone switching equipment,
    an adaptor circuit to enable the key telephone subset and the work station terminal to be connected to voice and signalling lines from the key telephone switching equipment, the adaptor further comprising
        a processor,
        a first interface circuit between the processor and a portion of the signal line leading to the switching equipment,
        a second interface circuit between processor and a portion of the signal line leading to the telephone subset, and
        a third interface circuit between the terminal and the processor,
    wherein the processor is programmed to control the first and second interfaces such that
        in a first mode, signals on said signal line portions are passed between each other unaltered in format, and
        in a second mode, when it is desired to use the work station to perform telephone call functions, the processor causes the signal line portion leading to the telephone subset and the signal line portion leading to the telephone switching equipment to be coupled to the second and first interface circuits respectively, with the processor emulating the telephone subset through the first interface circuit and emulating the
    telephone switching equipment through the second interface circuit, wherein the work station terminal contains one or more programs incorporating telephone directory information, selected portions of which the terminal can be instructed to transmit to the adaptor circuit via the third interface circuit output signals to cause the adaptor circuits processor to initiate telephone call set-up signalling corresponding to the selected portions of the directory information.

12. A system as claimed in claim 11 wherein the third interface circuit translates output signals from the work station terminal to a format suitable for the processor and wherein the processor generates signals suitable for the switching equipment in response to the work station output signals.

13. A system as claimed in claim 11, wherein the terminal transmits data to the processor via the third interface and wherein the processor conveys the data or a translation thereof to a modem which converts the data to a form suitable for transmission over the voice line, and wherein signals received over the voice line are conveyed to the terminal via the modem, which converts the received signals to the appropriate form and transmits them through the processor and third interface to the terminal.

14. A system as claimed in claim 11, wherein the terminal includes a menu selection program providing a selection of two or more telephone mode operations which can be selected by the user.

15. A system as claimed in claim 14, wherein the menu selection includes two or more key telephone system subset functions selected from the group consisting of directory, last number redial, repertory dial, abbreviated dial, and line selection functions.

* * * * *